United States Patent
Savoy

(10) Patent No.: US 8,998,484 B2
(45) Date of Patent: Apr. 7, 2015

(54) WATCH STRAP WITH INTERCHANGEABLE INDICIA

(71) Applicant: Pascal Savoy, Ft. Lauderdale, FL (US)

(72) Inventor: Pascal Savoy, Ft. Lauderdale, FL (US)

( * ) Notice: Subject to any disclaimer, the term of this patent is extended or adjusted under 35 U.S.C. 154(b) by 381 days.

(21) Appl. No.: 13/622,185

(22) Filed: Sep. 18, 2012

(65) Prior Publication Data

US 2014/0078871 A1 Mar. 20, 2014

(51) Int. Cl.
*A44C 5/00* (2006.01)
*B29C 45/14* (2006.01)
*B29L 31/00* (2006.01)

(52) U.S. Cl.
CPC . *A44C 5/00* (2013.01); *B29C 45/14* (2013.01); *B29L 2031/7276* (2013.01)

(58) Field of Classification Search
USPC .......... 368/88, 281, 282, 285; 59/80; 63/1.14, 63/3, 21, 40
See application file for complete search history.

(56) References Cited

U.S. PATENT DOCUMENTS

| | | | | |
|---|---|---|---|---|
| 4,255,801 A | * | 3/1981 | Ode et al. | 368/10 |
| 5,630,329 A | * | 5/1997 | Lauffer et al. | 63/5.1 |
| 6,619,836 B1 | * | 9/2003 | Silvant et al. | 368/281 |
| 7,028,507 B2 | * | 4/2006 | Rapport | 63/3 |
| 8,064,292 B2 | * | 11/2011 | Burton | 368/88 |
| 8,474,284 B2 | * | 7/2013 | Rush et al. | 63/40 |
| 2014/0090418 A1 | * | 4/2014 | Mihalyo | 63/3 |

* cited by examiner

*Primary Examiner* — Vit W Miska
(74) *Attorney, Agent, or Firm* — Leason Ellis LLP

(57) ABSTRACT

In accordance with the present invention, a method for forming a watch strap part includes the steps of: placing an insert plate within a mold; and injecting a moldable material into the mold around the insert plate so as to at least partially embed the insert plate and form a body of the watch strap part with the insert plate defining a floor of a recessed portion formed in the body of the watch strap part. The recessed portion is configured to receive a decorative insert that is securely attached to the insert plate and provides a decorative appearance.

19 Claims, 2 Drawing Sheets

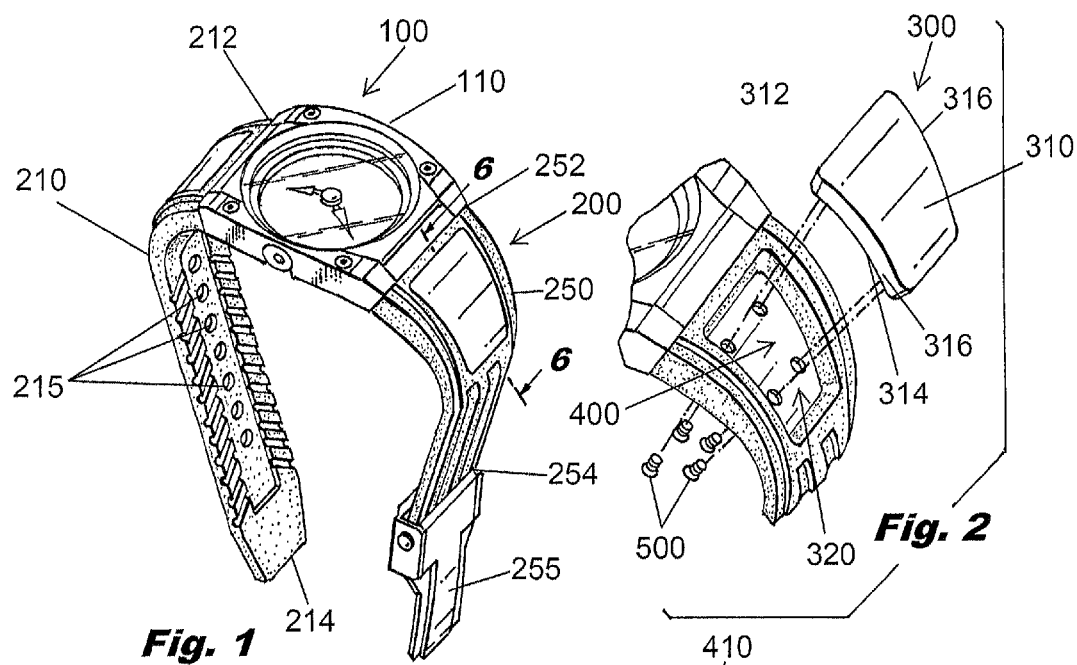
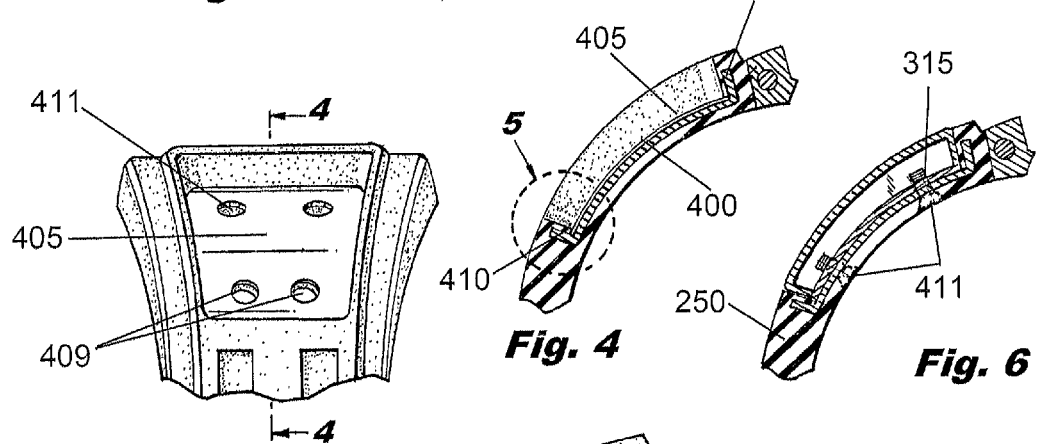

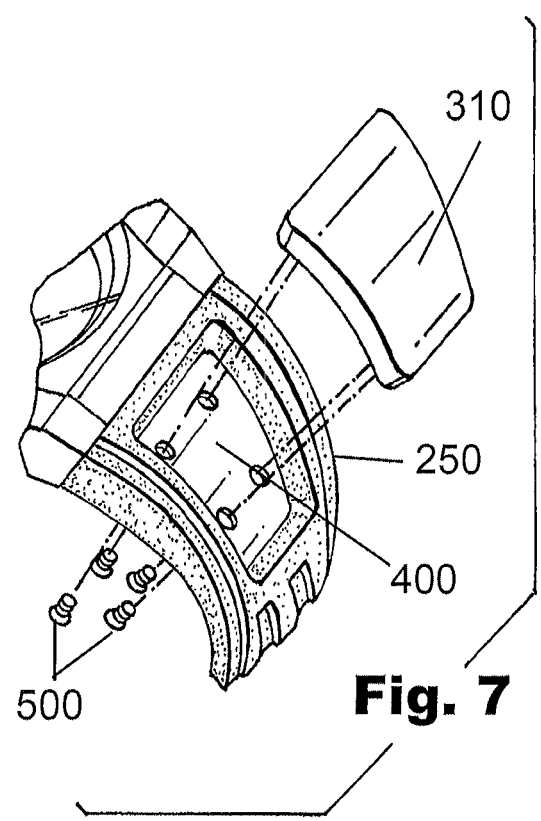

WATCH STRAP WITH INTERCHANGEABLE INDICIA

TECHNICAL FIELD

This invention relates in general to a watch strap and more particularly to a watch strap that has interchangeable indicia that allows the look of the watch strap to be changed.

BACKGROUND

A watch is a timepiece, typically worn either on the wrist or attached on a chain and carried in a pocket. Wristwatches are the most common type of watch used today. There are a vast number of different types of watches that come in any number of different styles to please different tastes. A number of different materials can be used to make such watches.

Generally, a wrist watch includes a housing or casing (that includes the watch face and the internal components of the watch) and some type of band construction that attached to the casing and is worn around the wrist of the user. In the field of watches, "band" and "watchband" are vague, generic terms used to refer to the band that holds a watch on the wrist of the user. The preferred terms are bracelet or strap, which describe the two major types. A bracelet is a metal link watch band. Similar to a jewelry bracelet, a watch band can have a clasp to open it. A strap is a watch band made of cloth, rubber, leather or other non-metal material. While it is typically possible to switch the strap of a watch, this is typically only done when a strap is damaged or there is a desire to make a long term change in the type of strap being used. Typically, tools are needed to remove the strap.

There is therefore a need and desire to provide a watch strap that offers interchangeable decorative indicia that is associated therewith and allows the appearance of the watch strap to be altered without having to completely remove the watch strap.

SUMMARY

In accordance with one embodiment, a watch strap for use with a watch includes a first strap part having a first end for attachment to a watch casing and an opposing second end. The first strap part includes a recessed portion proximate the first end. The watch strap also includes a second strap part having a first end for attachment to the watch casing and an opposing second end. The second strap part includes a recessed portion proximate the first end. The watch strap also includes a pair of insert plates disposed within the recessed portions of the first and second strap parts and defining floors of the respective recessed portions. The insert plates are formed of a material that is different than a material of the first and second strap parts. Each insert plate has a means for attaching a decorative insert to the respective strap part such that the decorative insert is at least substantially contained within the respective recessed portion.

In accordance with the present invention, a method for forming a watch strap part includes the steps of: placing an insert plate within a mold; and injecting a moldable material into the mold around the insert plate so as to at least partially embed the insert plate and form a body of the watch strap part with the insert plate defining a floor of a recessed portion formed in the body of the watch strap part. The recessed portion is configured to receive a decorative insert that is securely attached to the insert plate and provides a decorative appearance.

In another embodiment, a method for forming a watch strap part includes the step of: forming an elongated watch strap body that has a first end and an opposite second end and a pair of sides, with a recessed portion being formed in the between the first and second ends and between the pair of sides. The recessed portion has a floor section and upstanding side walls extending around a peripheral edge of the floor section. The floor section includes a plurality of first through openings formed therein. The method also includes the step of securely attaching an insert plate to the floor section of the recessed portion such that the insert plate defines a floor of the recessed portion. The insert plate has a plurality of second through openings formed therein. The first and second through openings are axially aligned with one another. The recessed portion is configured to receive a decorative insert that is securely attached to the insert plate and provides a decorative appearance.

BRIEF DESCRIPTION OF THE DRAWING FIGURES

FIG. 1 is a side and top perspective view of a watch with a watch strap in accordance with one embodiment of the present invention;

FIG. 2 is an enlarged perspective view of one portion of the watch of FIG. 1 showing a decorative insert exploded from the strap;

FIG. 3 is a side elevation view of an insert receiving recess formed in the strap;

FIG. 4 is a cross-sectional view taken along the line 4-4 of FIG. 3;

FIG. 5 is an enlarged cross-sectional view of a portion of FIG. 4;

FIG. 6 is a cross-sectional view taken along the line 6-6 of FIG. 1; and FIG. 7 is an enlarged perspective view of one portion of a watch according to a different embodiment showing a decorative insert exploded from the strap.

DETAILED DESCRIPTION OF THE DRAWING FIGURES

FIGS. 1-6 illustrate a watch 100 according to one embodiment. The watch 100 includes a watch casing or housing 110 and a band 200 in the form of a strap. It will be appreciated that any number of different types of watch casings can be used and the illustrated watch casing is merely exemplary in nature.

The watch strap 200 is formed of a first part or piece 210 and a second part of piece 250. The first strap part 210 includes a first end (proximal end) 212 and an opposing second end (distal end) 214. Similarly, the second strap part 250 includes a first end (proximal end) 252 and an opposing second (distal end) 254. The first ends 212, 252 of the first and second strap parts 210, 250, respectively, are fixedly attached to the watch casing 110 using conventional techniques including different types of mechanical fasteners, such as pins, etc. The second ends 214, 254 are the ends of the straps 210, 250 that attach to one another to complete the strap and attach the strap 200 around the user's wrist. The structures and lengths of the straps 210, 250 can and typically are different from one another and in particular, the first strap part 210 can be thought of as being a long strap part, while the second strap part 250 can be thought of as being a short strap part.

Any number of conventional fastening means can be used to attach the distal ends 214, 254 to one another including but not limited to mechanical fasteners, etc. For example, the distal end 214 can include a first fastener 215 in the form of a plurality of openings 215 that are formed in the first strap part 210. The distal end 254 of the second strap part 250 can include a second fastener 255 that mates with the first fastener 215. The second fastener 255 can be in the form of a buckle or clasp structure and when in the form of a buckle, as shown, the buckle 255 includes a prong that is received within one opening 215 for coupling the two strap parts 210, 250 together.

The strap 200 can be formed of any number of conventional materials that are suitable for use in straps including but not limited to plastic, rubber, leather, synthetic materials (moldable/polymerizable materials), etc.

In accordance with the present invention, the strap 200 includes an interchangeable indicia feature 300 that allows the user to alter the appearance of the strap 200 without having to physically remove and replace the strap 200, More specifically, the strap 200 includes at least one and preferably a pair of indicia containing or decorative inserts 310 that are securely affixed to the strap 200. In the illustrated embodiment, the first strap part 210 can have one insert 310 associated therewith and the second strap part 250 can have another insert 310 associated therewith.

It will be understood that the insert 310 can have one or more colors and can be formed of a solid color or a pattern of colors. For example, the insert can have a color pattern. In addition, the insert 310 can be formed of any number of different materials and can be formed of one or two or more materials. The material of the insert 310 can be different than the material of the strap 200. For example, the insert can be formed of a natural material, such as a gemstone, glass, polished stone, marble, etc., or can be formed of a synthetic material. The insert 310 can be formed of a fibrous material, such as carbon fibers or another fibrous material.

The insert 310 has a top surface 312, a bottom surface 314, and a plurality of side walls 316. The insert 310 can have any number of different shapes, In the illustrated embodiment, the insert 310 has a trapezoidal shape with one pair of parallel walls and a pair of angled walls extending therebetween. The insert 310 is also a curved structure as appreciated in a side view thereof, In other words, the body of the insert 310 is a curved body.

Along the bottom surface 314, the insert 310 includes one or more openings 315. The openings 315 are not through openings and they do not pass through to the top surface 312. In addition, the openings 315 can be threaded openings. In the illustrated embodiment, the insert 310 has four spaced openings 315. The bottom surface 314 is hidden from view as discussed below, while the top surface 312 represents the decorative surface that is viewable since it is prominently displaced along the strap 200 proximate the casing 110 of the watch 100.

In the illustrated embodiment, each of the first and second strap parts 210, 250 can include a recessed portion 320 for receiving the insert 310. For example, proximate the first ends 212, 252 of the parts 210, 250, one recessed portion 320 is formed. The shape of the recessed portion 320 is complimentary to the shape of the insert 310. The depth of the recessed portion 320 is such that when the insert 310 is inserted into the recessed portion 320, the top surface 312 is either generally flush with the adjacent top surfaces of the respective strap parts or is either slightly above or slightly below these adjacent top surfaces. This results in the insert 310 not being an obstruction along the strap but instead is part of a clean strap finish that is aesthetically pleasing.

In accordance with the present invention, the recessed portion 320 can be formed, in some embodiments, at the time of making the strap parts 210, 250. For example, when the strap parts 210, 250 are formed of a moldable material, such as a synthetic material, rubber, etc., the recessed portions 320 can be formed during this common manufacturing process.

The recessed portion 320 includes an insert plate 400 disposed therein. The plate 400 has a shape complementary to at least the bottom surface 314 of the insert 310 since when the insert 310 is disposed and secured within the recessed portion 320, the bottom surface 314 of the insert 310 is in contact (i.e., sits flush against) with the top surface of the recessed portion 320. The insert plate 400 thus defines the floor of the recessed portion 320. Side walls 322 of the recessed portion 320 are defined around the insert plate 400 and define the sides of the recessed portion 320 that seat against the side walls of the insert 310.

The base section 405 of the insert plate 400 seats against a bottom wall of the recessed portion 320 in that the base section 405 of the insert plate 400 is not visible along the bottom of the strap parts.

In one embodiment, the side walls 322 are formed of the same material (e.g., rubber) that forms the rest of the strap parts 210, 250. This construction can result despite the fact that the insert plate 400 can include upstanding walls 410 that are formed around the perimeter edge of the base section 405 that defines the floor of the recessed portion 320 and to which the insert 310 seats against. FIGS. 4 and 5 show such an arrangement and it will be appreciated that these upstanding walls 410 can be covered during a mold over (cast over) process during formation of the strap parts 210, 250. As a result of this process, the upstanding walls 410 are not visible but are covered by the material that forms the respective strap part.

The insert plate 400 can be formed of a rigid material to allow the insert 310 to be securely mounted thereto. For example, the insert plate 400 can be formed of a metal material. Alternatively, a rigid plastic could be used.

The base section 405 of the plate 400 includes a plurality of through openings 409. There are also a plurality of through openings 411 that are formed in the respective strap part in the portion thereof that is located below the base section 405 of the insert plate 410. The through openings 409 are axially aligned with the through openings 411 and when the insert 310 is disposed within the recessed portion 320, the openings 315 formed therein are axially aligned with the openings 409, 411.

The axial alignment of the openings 315, 409, 411 allow fasteners 500 to be used to securely attach the insert 310 to the insert plate 400. The fasteners 500 can be in the form of screws or lugs as shown that mate with threaded openings 315 formed in the insert 310. The fasteners 500 are thus only visible on the bottom of the strap parts. As shown best in FIG. 6, the fasteners 500 pass through the openings 315, 411 and extend into the openings 409, thereby securely attaching the insert 310 to the respective strap part with the insert 310 being set within the recessed portion 320. In this embodiment, the insert plate 400 is in the form of a curved plate with peripheral walls or lip, etc., and is attached to the bottom wall of the recessed portion 320 using conventional techniques. For example, the insert plate 400 can be bonded to the bottom wall as part of a common mold process in which the strap part is formed (overmold process) or insert plate 400 can be bonded to the bottom wall using an adhesive or the like as shown in FIG. 7.

When an adhesive or bonding agent is used as in FIG. 7, the strap part can thus be formed first and then the insert part is subsequently bonded to the formed strap part.

In yet another embodiment (not shown), the upstanding walls 410 of the insert plate 400 can be visible and define the side walls of the recessed portion 320. The upstanding walls 410 can be bonded to the walls that define the recessed portion 320 as part of a common mold process (as discussed herein) or using other means, such as the use of an adhesive/bonding agent. In this embodiment, the side walls of the insert 310 at least partially seat against the upstanding walls 410 of the insert plate 400.

In accordance with all of the embodiments of the present invention, the insert plate 400 is formed of a material that is different than the material used to form the respective strap part in which the insert plate 400 is mounted.

It will be appreciated that the inserts 310 are preferably symmetrically oriented relative to the casing 110 of the watch 100 even though the lengths of the strap parts 310, 350 are different. However, it is within the scope of the present invention that the inserts 310 can be different from one another and are not necessarily symmetrically oriented relative to the casing 110.

What is claimed is:

1. A watch strap for use with a watch comprising:
    a first strap part having a first end for attachment to a watch casing and an opposing second end, wherein the first strap part includes a recessed portion proximate the first end;
    a second strap part having a first end for attachment to the watch casing and an opposing second end, wherein the second strap part includes a recessed portion proximate the first end;
    a pair of insert plates disposed within the recessed portions of the first and second strap parts and defining floors of the respective recessed portions, the insert plates being formed of a material that is different than a material of the first and second strap parts, each insert plate having a means for attaching a decorative insert to the respective strap part such that the decorative insert is at least substantially contained within the respective recessed portion.

2. The watch strap of claim 1, wherein the first and second strap parts are formed of a moldable material.

3. The watch strap of claim 1, wherein the insert plate is formed of a metal and the first and second strap parts are formed of a non-metal.

4. The watch strap of claim 3, wherein the first and second strap parts are formed of a material selected from the group consisting of rubber and a synthetic polymeric material.

5. The watch strap of claim 1, wherein the insert plate is embedded within the respective watch strap part in situ during a common mold process.

6. The watch strap of claim 1, wherein each of the first and second watch strap parts and the insert plate include a plurality of through openings formed therethrough.

7. The watch strap of claim 6, wherein the through openings receive fasteners that fixedly attach the decorative insert to the insert plate.

8. The watch strap of claim 1, wherein the insert plate includes an upstanding lip that extends around a periphery.

9. The watch strap of claim 8, wherein the upstanding lip is fully embedded within a body of the respective strap part.

10. The watch strap of claim 9, wherein the upstanding lip is fully embedded during a common mold process in which the respective watch strap part is formed and therefore the upstanding lip is not visible within the recessed portion.

11. The watch strap of claim 1, wherein the insert plate has a curved shape.

12. The watch strap of claim 8, wherein the upstanding lip forms a perimeter side wall of the recessed portion and is visible within the recessed portion.

13. The watch strap of claim 1, wherein the means comprises through openings formed in the insert plate that receive fasteners that securely attach to threaded openings formed in the decorative insert to thereby fixedly attach the decorative insert to the insert plate.

14. A method for forming a watch strap part comprising the steps of:
    placing an insert plate within a mold; and
    delivering a moldable material into the mold around the insert plate so as to at least partially embed the insert plate and form a body of the watch strap part with the insert plate defining a floor of a recessed portion formed in the body of the watch strap part, the recessed portion being configured to receive a decorative insert that is securely attached to the insert plate and provides a decorative appearance.

15. The method of claim 14, wherein the insert plate includes a floor section and an upstanding lip formed along a peripheral edge of the floor section, the upstanding lip being embedded within the body of the watch strap part such that only the floor section of the insert plate is visible within the recessed portion.

16. The method of claim 14, wherein the insert plate has a curved shape.

17. The method of claim 14, wherein the insert plate is formed of metal and the moldable material comprises one of a polymerizable material and rubber.

18. A method for forming a watch strap part comprising the steps of:
    forming an elongated watch strap body that has a first end and an opposite second end and a pair of sides, with a recessed portion being formed in the between the first and second ends and between the pair of sides, the recessed portion having a floor section and upstanding side walls extending around a peripheral edge of the floor section, the floor section including a plurality of first through openings formed therein; and
    securely attaching an insert plate to the floor section of the recessed portion such that the insert plate defines a floor of the recessed portion, the insert plate having a plurality of second through openings formed therein, the first and second through openings being axially aligned with one another, the recessed portion being configured to receive a decorative insert that is securely attached to the insert plate and provides a decorative appearance.

19. The method of claim 18, wherein the step of attaching the insert plate to the floor section comprises bonding the insert plate to the floor section of the recessed portion.

\* \* \* \* \*